United States Patent [19]

Böning et al.

[11] Patent Number: 4,811,306

[45] Date of Patent: Mar. 7, 1989

[54] DMA CONTROL DEVICE FOR THE TRANSMISSION OF DATA BETWEEN A DATA TRANSMITTER

[75] Inventors: Werner Böning; Wolfgang Wagner, both of Munich, Fed. Rep. of Germany; Sharad Gandhi, Peekskill, N.Y.; Hans Stadlmeier; Franz Schönberger, both of Munich, Fed. Rep. of Germany

[73] Assignee: Siemens Aktiengesellschaft, Berlin and Munich, Fed. Rep. of Germany

[21] Appl. No.: 833,664

[22] Filed: Feb. 24, 1986

Related U.S. Application Data

[63] Continuation of Ser. No. 549,651, Nov. 7, 1983, abandoned.

[30] Foreign Application Priority Data

Nov. 9, 1982 [DE] Fed. Rep. of Germany ....... 3241376

[51] Int. Cl.[4] .......................... G06F 3/04; G06F 9/22; H04L 25/02
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,909,799 | 9/1975 | Recks et al. ......................... | 364/200 |
| 4,067,059 | 1/1978 | Derchak ............................... | 364/200 |
| 4,075,691 | 2/1978 | Davis et al. ......................... | 364/200 |
| 4,091,455 | 5/1978 | Woods et al. ....................... | 364/200 |
| 4,156,279 | 5/1979 | Wilhite ................................ | 364/200 |
| 4,245,305 | 1/1981 | Gechele et al. ..................... | 364/200 |

FOREIGN PATENT DOCUMENTS 1480781 of 0000 United Kingdom .
1480782 of 0000 United Kingdom .

OTHER PUBLICATIONS

Intel MCS-80/85 Family User's Manual, 10/79, pp. 6-101 to 6-114.

Primary Examiner—Gary V. Harkcom
Assistant Examiner—Christopher H. Lynt
Attorney, Agent, or Firm—Herbert L. Lerner; Laurence A. Greenberg

[57] ABSTRACT

A Dynamic Memory Access (DMA) control device for transmitting data between a data transmitter and a data receiver via an external bus formed of a data bus, an address bus and a control bus, and has a multiplicity of data transmitters/receivers and at least one microprocessor connected thereto. The transmission of the data in the external bus depends upon a channel program containing channel transfer commands and channel control commands, and includes a central control unit for addressing, dependent upon a channel command, a microcommand, address and control signals corresponding to the microcommand on an internal address-control bus; an address unit is connected to the internal address/control bus and to an internal data bus wherein addresses of a data transmitter, data receiver and the channel program are stored. The address unit delivers an address and simultaneously computes and stores the delivered address; a data unit provides interim data storage; a byte counter unit is connected to the internal data bus and address/control bus for counting the number of bytes to be transmitted; a data transmitting bus interface circuit is connected to the output of the address unit, to the external address bus and to the internal address/control bus, and to the external data bus. A control register is connected to the internal bus for receiving a channel command word, status words and other control information, from which lines for transmitting control signals extend to the central control unit; the units have devices for independently executing the tasks assigned to them.

20 Claims, 7 Drawing Sheets

DMA CONTROL DEVICE FOR THE TRANSMISSION OF DATA BETWEEN A DATA TRANSMITTER

This application is a continuation of application Ser. No. 549,651, filed Nov. 7, 1983, now abandoned.

BACKGROUND OF THE INVENTION

Field of the Invention

The invention relates to a DMA or dynamic memory access control device for the transmission of data between a data transmitter and a data receiver via an external bus formed of a data bus, an address bus and a control bus to which a multiplicity of data transmitters/receivers and at least one microprocessor are connected and in which the data are transmitted in dependence upon a channel program containing channel transfer commands and channel control commands.

From German Patent Nos. 23 39 813 and 23 39 787, it has become known that data transfers between a data transmitter, such as a memory, for example, and a data receiver, such as peripheral equipment, for example, are performed in a data processing system by means of so-called channel programs. The channel programs indicate how the data transfer should be performed; however, they also indicate how the organizational cycles, such as equipment start-up, interrogation of equipment state, equipment stop, and interrupt requests to the arithmetic unit etc. are to be carried out. The channel programs are performed in a data processing system of this type by means of channel mechanisms which perform the data transfer independently of the arithmetic unit of the data processing system.

The channel mechanisms of such large computers perform the data transfer either in selector operation or in multiplex operation. The multiplex operation may be byte multiplex operation or block multiplex operation. The transmission devices via which the data transfer is effected are hereinafter referred to as channels.

The data transfer between a data transmitter and the data receiver can also be controlled by means of microcomputer systems. Such microcomputer systems, as a rule, contain at least one microprocessor, a memory and peripheral equipment which are connected to an external bus either directly or via intermediate units. The addresses, the data and the control signals are then transferred via the external bus. The control of the data transfer, for example, between the memory and a peripheral equipment is controlled in dependence upon the afore-mentioned channel programs. For this purpose, the channel programs contain transfer commands which indicate from which data transmitter to which data receiver the data are to be transmitted, and control commands which control the organizational cycles.

In order to relieve the microprocessor of the control function it has become known heretofore to connect to the external bus additionally a DMA control device which controls the data transfer largely independently of the microprocessor. While the DAM control device carries out the data transfer, the microprocessor can take care of other problems. Such a microcomputer system is found, for example, in Elektronik-Praxis, No. 9, September 1982, pages 131 to 134.

An object of the invention is to provide a DMA control device which is constructed in MOS technology and affords data transmission at very high rates via one or more channels.

Summary of the Invention

With the foregiong and other objects in view, there is provided, in accordance with the invention, a DMA control device of the general type described at the introduction hereto having a central control unit which addresses a microcommand of a microprogram associated with the channel command and in the process applies address and control signals corresponding to the microcommand to an internal address/control bus; an address unit which is connected to the internal address-/control bus and to an internal data bus and wherein the addresses of the data receivers, data transmitters and the channel programs are stored, the address unit delivering at the output an address addressed in the microcommand and simultaneously computing a new address and storing it; a data unit wherein the data to be transmitted are put in interim storage, the data unit being connected to the internal address/ control bus and data bus; a byte counter unit connected to the internal data bus and address/control bus for counting the number of the bytes to be transmitted in the event of a transfer command and delivering a signal to the central control unit when the desired number is reached; a bus interface circuit which is connected to the output of the address unit, to the external address bus and to the internal address/control bus for transmission of addresses and which is connected to the external data bus for transmission of the data to and from the data unit; and a control register set which is connected to the internal data bus and address/control bus for receiving channel commands, status words and other control information and from which lines for transmission of control signals lead to the central control unit; and the units being constructed so that they perform independently tasks assigned to them.

In accordance with another feature of the invention, the central control unit includes a microprogram unit with a sequencer, with a microprogram memory connected to the sequencer for receiving microprogram assigned to the channel commands, and an interim microcommand register connected to the microprogram memory; a first microcommand register unit with a microcommand register which is connected to the interim microcommand register and is connected to the internal address/control bus and to the sequencer, and with a second microcommand register connected to the first microcommand register; and a second microcommand register unit which is connected to the second microcommand register and is also connected to one second microcommand register and is also connected to the internal address/control bus.

In accordance with a further feature of the invention the address unit contains an address register set for storing the data transmitter/data receiver and channel program addresses, the address register set being connected to the internal address/control bus for taking over the addresses of an address register to be loaded and being connected to the internal data bus for transferring the to-be-locked content of the addressed address register, and which is connected to the first microcommand register for taking over the address of that address register having a content which is transferred at the output to the interface circuit. Additionally, the address unit contains an address computer having an output which is connected to the input of the address register set, which, in turn, has one input connected to the output of the address register set, and has another input connected to a first multiplexer, via which a quantity is fed-in which must be added to the address delivered from the address register.

In accordance with an added feature of the invention, the interface circuit includes an address buffer circuit which is connected to the output of the address unit and which is connected to the external address bus and, via a switch, to the internal address/ control bus; a data buffer circuit which is connected to the external data bus via an input register and output register; and a clock generator which generates from an external clock signal the clock signals which are required for the cooperation of the units. Such an interface circuit is of simple construction and affords the transmission of addresses and data from and to the external address and data bus, independently of the activity of the address unit.

The control device according to the invention is constructed so that a data transmission via several channels can be controlled. Switching from one channel to another channel is as fast as possible. Specifically, it is so fast that the sum data rate, at which the transmission via several channels is performed, corresponds to the individual data rate at which the transmission via an individual channel is performed. In order to achieve this, the microaddress register and the interim microcommand register in the microprogramming unit, the address registers in the address unit and the control registers in the control register set are realized in multiple in accordance with the number of transmission channels. By means of a priority circuit provided in the central control unit, one of the registers is then assigned to the selected channel according to a priority decision.

In order to achieve a data rate of 8 Mbyte/sec, for example, in the data transmission, the individual units of the DMA control device are constructed so that they can take over individual problems in the control of the data transmission independently of one another and in part simultaneously with one another. In order to achieve this and, in accordance with another aspect of the invention, there is provided a method for operating the DMA control device which comprises, in a first clock cycle, transferring the actual microcommand, which is already stored in the interim microcommand register, into the first microcommand register of the first microcommand register unit and storing it there up to the end of a second clock cycle; in the second half of the second clock cycle, transferring the actual microcommand from the first microcommand register into the second microcommand register and storing it there up to one-half of a fourth clock cycle; at the beginning of the fourth clock cycle to the end of a fifth clock cycle, transferring the actual microcommand from the second microcommand register into the second microcommand register unit and from there applying the actual microcommand to the internal address/control bus; in the second half of the first clock cycle, reading the address register addressed in the actual microcommand; in the first half of the second clock cycle, recalculating the content of this address register by means of the address computer and rewriting the new content in the second half of the second clock cycle into this address register; with the beginning of the second clock cycle to the end of the third clock cycle, applying the address from the address unit by means of the interface circuit to the external address bus; in the event of a write command, feeding the write data with the beginning of the third clock cycle to the end of the fourth clock cycle, applying the write data by means of the interface circuit to the external data bus; in the presence of a read command in the first half of the fourth clock cycle, having the read data appearing on the external data bus taken over by the interface circuit; in the second half of the fourth clock cycle, transferring the read data into the data unit and storing the read data there; in the first half of the first clock cycle, computing the address of the next microcommand to be processed, by means of the microprogram unit and storing it during the second half of the first clock cycle; during the first half of the second clock cycle, reading the next microcommand and interim-storing it in the second half of the second clock cycle in the interim-microcommand register; and at the beginning of the third clock cycle, transferring the next actual microcommand into the microcommand register of the first microcommand register unit and storing it there up to the end of the fourth clock cycle; and repeating the foregoing method steps.

In order to operate the device, there is provided a method of operating the DMA control device for transmitting data between a data transmitter and a data receiver via an external bus formed of a data bus, an address bus and a control bus and having a multiplicity of data transmitters/receivers and at least one microprocessor connected thereto, transmission of the data in the external bus being dependent upon a channel program containing channel transfer commands and channel control commands, which comprises generating, with a microprogram unit in dependence on a channel command in a channel command register or on a command in a command register, the address of a first microcommand of the microprogram associated with the command; and transmitting the microcommand associated with the microcommand address into an intermediate microcommand register; then generating with the microprogram unit the microcommand address of the next microcommand of the microprogram; and transferring this microcommand into the intermediate microcommand register. Further features of the DMA control device and modes of the method for operating the DMA control device are apparent from the claims.

The high data transmission rate under the control of the DMA control device is thereby achieved by subdividing the processing of a data transfer via the external bus i. e. a bus cycle, into individual steps; these steps are processed by associated units independently; these units mostly operate mutually simultaneously; the units are so independent of one another that at a given point in time almost any unit can process another channel. To this end, a unit, when its activity has been completed, passes its task on to the next unit and itself starts with a new task which may already have been assigned again to another channel. However, several units can also operate on the same bus cycle so that the task required for the execution of a bus cycle can be carried out in a short time. To further increase the speed of the data transmission, the individual units of the DMA control device can be further subdivided into subunits which in turn divide up the tasks assigned to the units and treat them separately.

Other features which are considered as characteristic for the invention are set forth in the appended claims.

Although the invention is illustrated and described herein as embodied in a DMA control device for the transmission of data between a data transmitter and a data receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
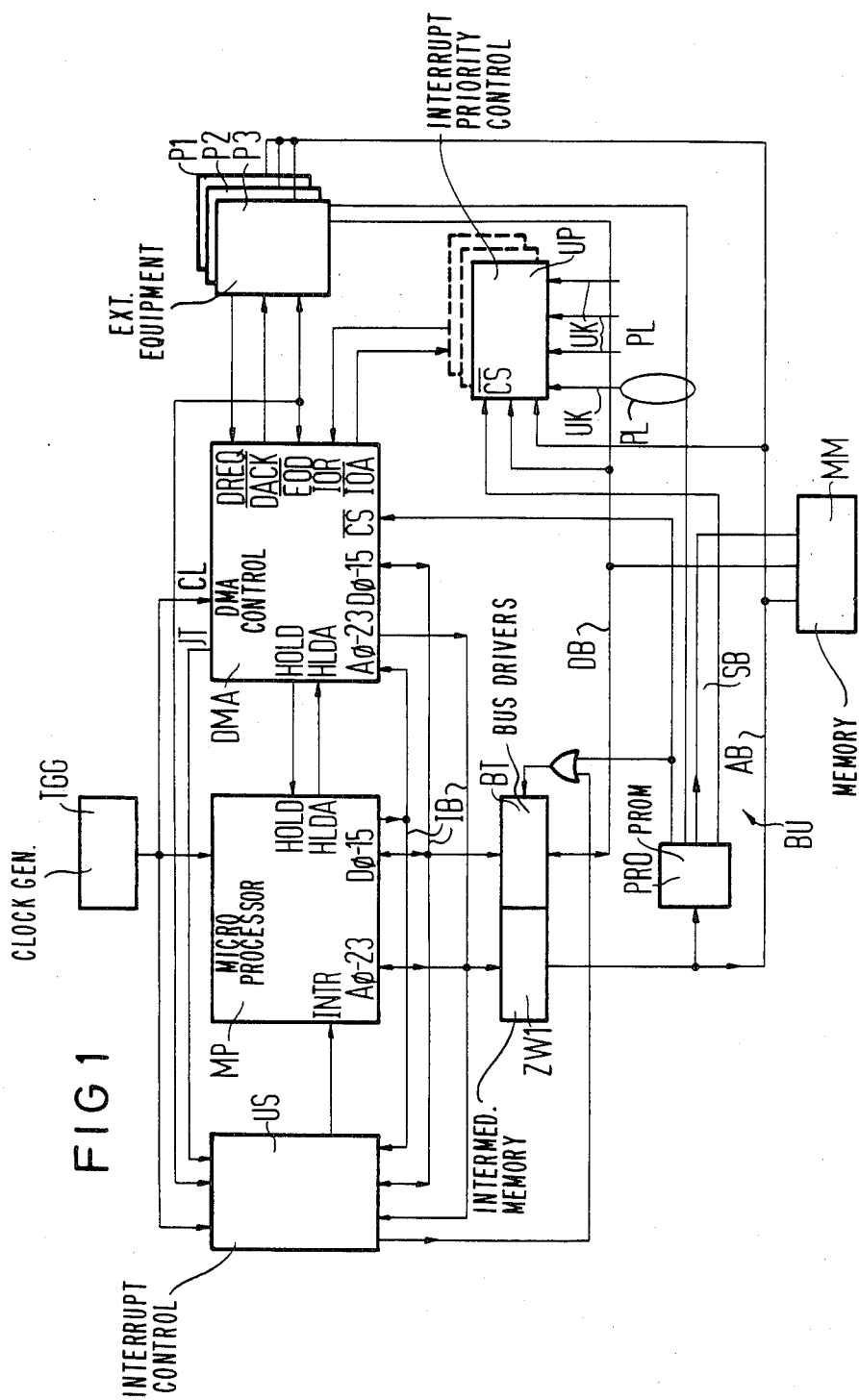
FIG. 1 is a block diagram of a microcomputer system with the DMA Control device.

Referring now to the drawing and first, particularly, to FIG. 1 thereof, there is shown therein one possible embodiment of a microcomputer system with a DMA control device according to the invention. A microprocessor MP and the DMA control device DMA are connected to one another via an internal bus IB for transmitting data, addresses and control signals. With the microprocessor MP, there is associated an interrupt control US which feeds interrupt requests IT from the control device DMA or from other points of the microprocessor system to the microprocessor MP in processed form. The internal bus IB is connected via intermediate memories ZW1 and bus drivers BT to an external bus BU which is formed of an address bus AB, a data bus DB, and a control bus SB. A memory MM as well as external equipment P1, P2, and P3 are connected to the external bus BU. In addition, an interrupt and priority control UP is arranged at the external bus BU; Subchannels UK extend from the control UP to slow peripheral equipment PL. The clock frequency required for the operation of the microcomputer system is furnished by a clock generator TGG.

The individual units of the microcomputer system are addressed by the microprocessor MP via the external control bus SB wherein, starting with addresses of the units to be addressed, the corresponding selection signal is generated by a PROM building block PRO. The access to the bus between the microprocessor MP and the control device DMA is determined by the signals HOLD and HLDA. The data transfer between the memory MM, for example, and the peripheral equipment P1 to P3 is controlled by the control device DMA and, specifically, with the aid of operating requests DREQ from the peripheral equipment and acknowledgment signals DACK from the control device DMA.

Interrupt requests between the peripheral equipment P1 to P3 and the control device DMA are exchanged via signals EOD. The equipment P1 to P3 are fast equipment and the data transfer between the peripheral equipment and the memory MM, for example, takes place in selector operation.

The interrupt control UP, by which the slow peripheral equipment PL is connected via the subchannels UK, cooperates with the DMA control by means of operating requests IOR and acknowledgment signals IOA. If several peripheral pieces of equipment PL make operating requests via several subchannels UK, the interrupt control UP selects the peripheral equipment with the highest priority corresponding to the priorities of the peripheral equipment PL, and passes its operating requests to the DMA control. The latter acknowledges the operating request and initiates the desired data transfer between the peripheral equipment and for example, the memory MM. Since the pieces of equipment PL are slow equipment, the data transfer between them and the data receivers or transmitters can take place in multiplex operation.

The units shown in FIG. 1 are all commercially available modules except for the control DMA which is shown in greater detail in the following figures.

Figure 2:
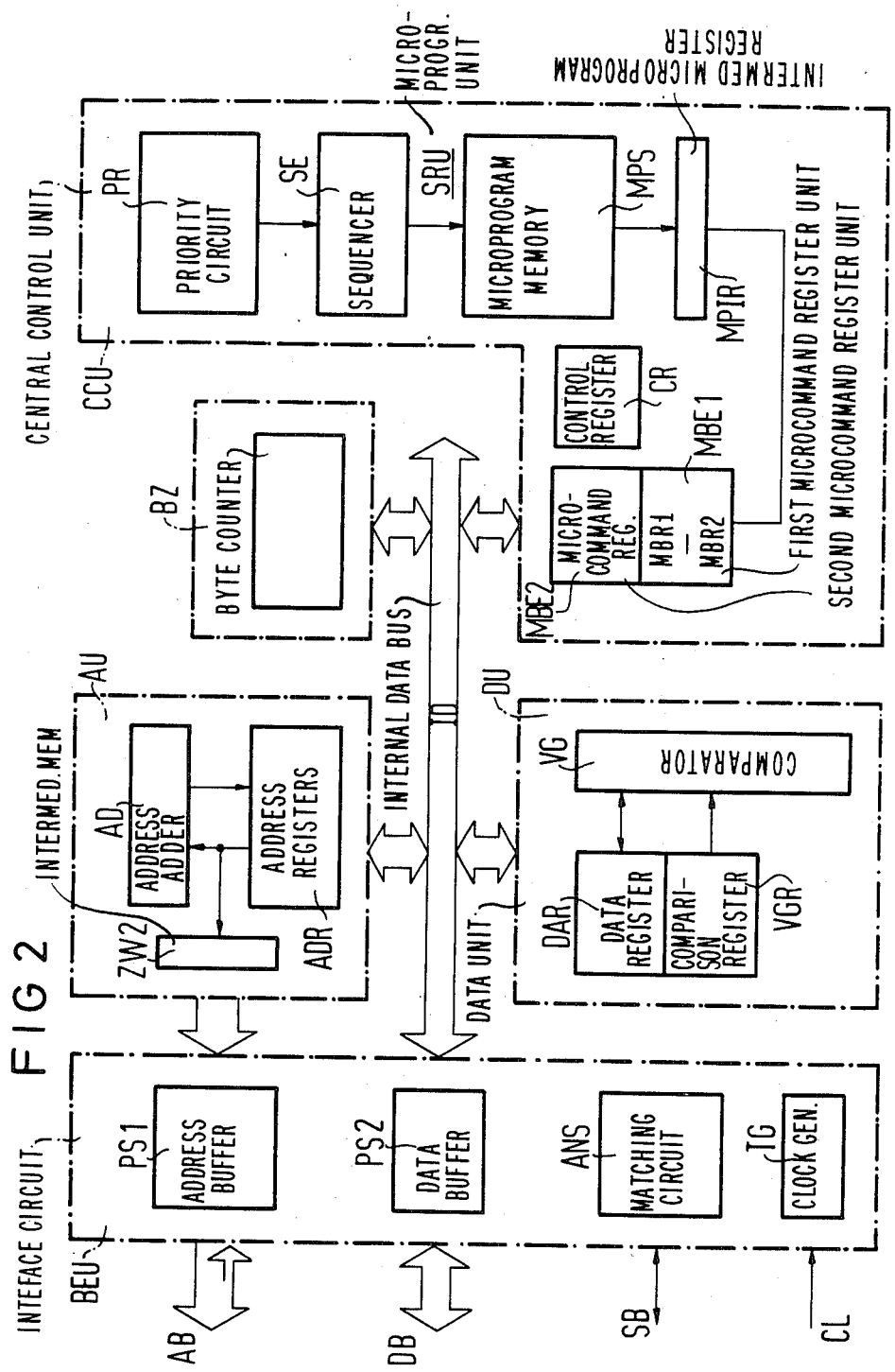
FIG. 2 is a block diagram of the DMA control device.

FIG. 2 is a block diagram of the DMA control device. The latter contains, first, a central control unit CCU which is formed of several subunits. A first subunit SRU is hereinafter referred to as the microprogram unit. It is formed of a sequencer SE, a microprogram memory MPS, and an intermediate microcommand register MPIR. The purpose of the microprogram unit SRU is to generate the microprogram addresses of the programs which are stored in the microprogram memory MPS and are associated with the start commands, stop commands and channel commands, to read out, with the address, the microcommand from the microprogram memory MPS and to store them in the intermediate microcommand register MPIR selected by a priority circuit PR in accordance with the priority decision. Thereafter, the address of the next microcommand can be generated by means of the sequencer, where the associated microcommand may already belong to a microprogram that is valid for another channel.

The central control unit CCU further contains a first microcommand register unit MBE1 which is formed of a first microcommand register and a second microcommand register. The first microcommand register unit MBE1 takes the microcommand to be executed, from the intermediate microcommand register MPIR and transfers it into the first microcommand register. With this, the execution of this microcommand starts. Next the actual microcommand is passed-on to the second microcommand register. Therewith, the first microcommand register becomes available again and the next microcommand can be taken from the intermediate microcommand register MPIR. This next microcommand also may belong to a microprogram which is associated with another channel.

The central control unit CCU contains, finally, a second microcommand register unit MBE2 with a microcommand register, into which the actual microcommand from the second microcommand register is transferred. By means of the second microcommand register unit MBE2, further control signals corresponding to the current microcommand are passed to other units of the DMA control device.

For example, the data transfer in the case of a read command is controlled by these control signals. In the case of a read command, data are transferred from a data transmitter into the DMA control device. When the actual microcommand is executed, a new microcommand can be taken into the second microcommand register unit MBE2, where also this new microcommand can be associated with another channel.

In the central unit CCU, there is further provided a control register set CR, wherein the start/stop command, channel commands and other control information for the DMA control device are stored. These are entered in part by the microprocessor MP into the control register set CR.

The DMA control device further contains an address unit AU, wherein address registers ADR, an address computer AD and an intermediate memory ZW2 are contained. In the address registers ADR, the addresses of the data transmitter, the data receiver and the address of the next channel command are stored. From the actual microcommand in the central control unit CCU, there is determined which address registers ADR in the address unit AU are to be read or written. The content of the selected address register can be passed to the bus interface circuit BEU and, thereafter, the content of this address register can be recalculated and stored back into the address register. The address unit AU can perform its tasks simultaneously with the activity of the first microcommand register unit MBE1, since the information required therefor is furnished by the first microcommand register of the first microcommand register unit MBE1. At the moment at which the next microcommand is transferred into the first microcommand register (which, of course, may be associated with another channel), the address unit AU will execute this next microcommand in accordance with the information intended for the address unit AU.

By means of a data unit DU of the DMA control device which contains, in particular, a data register DAR, the data to be transmitted can be interim-stored and possibly be subjected to processing. For example, the content of the data register DAR can be compared with the content of a comparison register VGR and, more specifically, in the comparator VG, and transmitted further to the data receiver only if the content of the data register is not the same. In the case of read commands, the data unit DU operates simultaneously with the second microcommand register unit MBE2, from which it receives also the necessary control information in this case. In the case of write commands, the data unit DU obtains the control information from the microcommand register unit MBE1. At the instant at which the second microcommand register unit MBE2 takes over a new microcommand which may be associated with another channel, the data unit DU serves again different purposes.

An interface circuit BEU establishes the connection to the external bus BU. The latter contains, first of all, an address buffer circuit PS1 which interim-stores and possibly modifies the addresses to be transmitted to the external address bus AB from the address registers ADR, or interim-stores the addresses present from the external address bus AB and passes them on to an internal address bus.

In the interface circuit BEU, there is further provided a data buffer circuit PS2 which is connected to the external data bus DB. In the data buffer circuit PS2, either data to be transmitted to the external data bus DB or data supplied by the external data bus DB are interim-stored. The activity of the address buffer circuit PS1 as well as that of the data buffer circuit PS2 is controlled by a microcommand so that, after the activity associated with this microcommand, the activity associated with another microcommand is performed. Thus, after processing the circuit microcommand, these circuits can become active for the next microcommand associated with a channel.

In the interface circuit BEU, a matching circuit ANS is further provided which is connected to the external control bus SB, and via which an exchange of control signals with other units connected to the external control bus SB is carried on.

Finally, the interface circuit BEU contains a clock generator TG, to which the external clock frequency or system clock CL is fed and which generates, from the external clock C1, the internal clock frequencies required for operating the units of the DMA control device.

The DMA control device, finally, also contains a byte counter unit BZ wherein the number of the data to be transferred by means of a transfer command or the number of bytes thereof is stored. If a byte is transmitted, the counter containing the byte counter unit is always decreased by one unit. The byte counter unit BZ operates simultaneously with the first microcommand register unit MBE1.

The individual units of the DMA control device are connected to one another via an internal data bus ID and an internal control/ address bus. In FIG. 2, only the internal data bus ID is shown.

The individual units of the DMA control according to FIG. 2 are constructed so that they perform the tasks thereof which are to be fulfilled by a current microcommand, or fulfill the tasks assigned to different microcommands simultaneously. After each microcommand, a change to a next microcommand which belongs to a microprogram assigned to another channel is possible.

Figure 3:
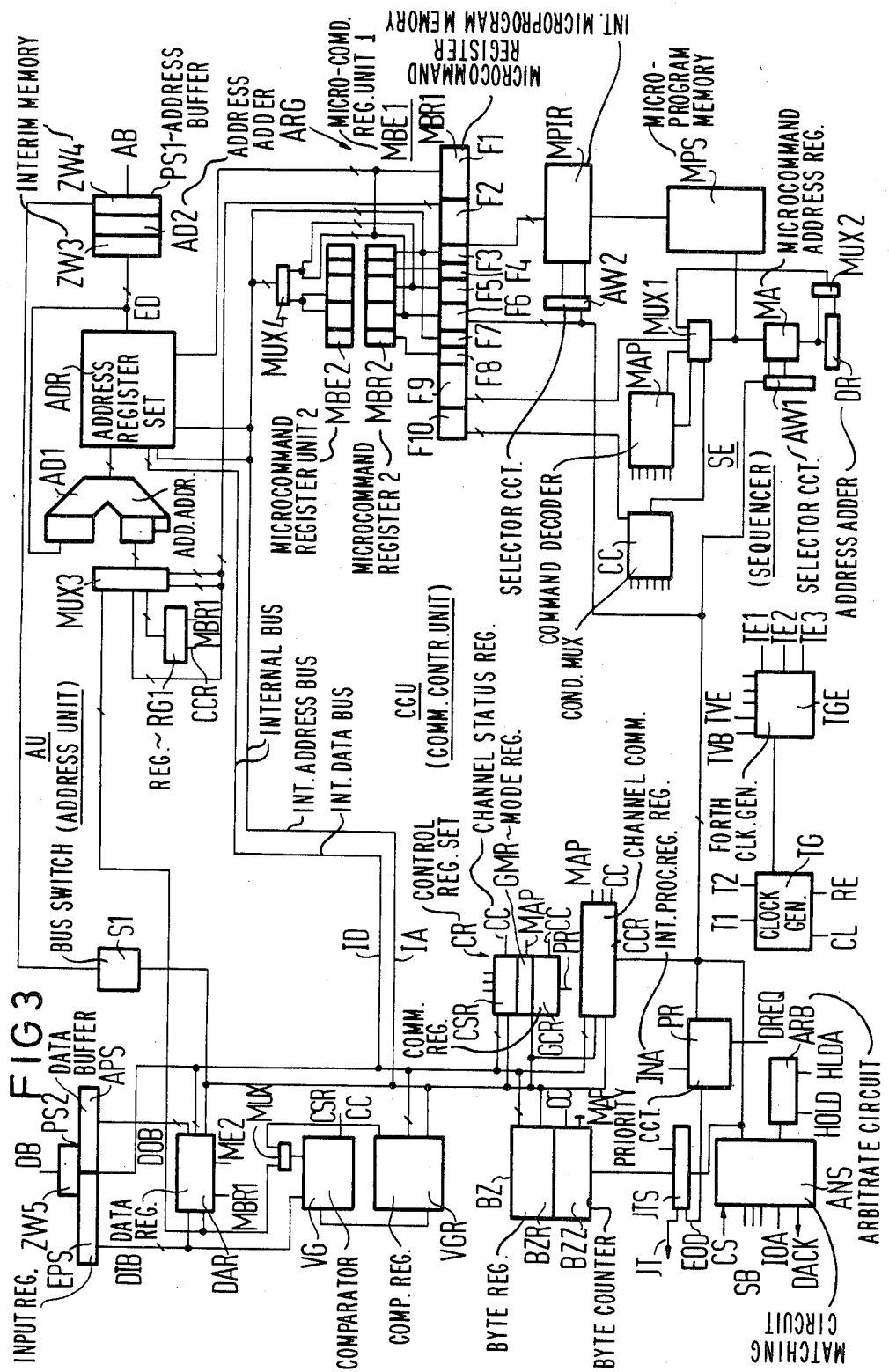
FIG. 3 is a more detailed circuit diagram of the DMA control device.

A more detailed circuit diagram of the DMA control device is provided in FIG. 3. First, the construction of the central control unit CCU is explained hereinafter. The central control unit CCU contains a sequencer SE of conventional construction. It is formed of a conditional multiplexer CC, a command decoder MAP, a first multiplexer MUXI, a microcommand address register MA, an address adder DR and a second multiplexer MUX2. The sequencer SE generates from a channel command or a start/stop command, by means of the command decoder MAP the starting address of the microprogram which is necessary for executing the command. These microprograms are stored in the microprogram memory MPS. The microprogram MPS is connected to an intermediate microcommand register MPIR, wherein the microcommands delivered by the microprogram memory MPS are interim-stored. The microcommand address register MA as well as the intermediate microcommand register MPIR may be formed of a multiplicity of registers which correspond to the number of associated channels. By means of a priority circuit PR, the channel via which the next data transfer is made, can be selected by means of the operating requests DREQ or internal processing requests INA which are present. Thereby, the register associated with this channel is addressed in the microcommand address register MA, however, by means of the selector circuit AW1 or the register assigned to the channel in the intermediate microcommand register MPIR, by means of the selector circuit AW2.

When the microcommand has been transmitted into the intermediate microcommand register MPIR, the sequencer SE can calculate the address of the next microcommand and can then address the next microcommand in the microprogram memory MPS by means of this address.

By the intermediate microcommand register MPIR, the current microcommand i.e. the next microcommand to be executed, can be transferred into the microcommand register unit MBE1. The first microcommand register unit MBE1 is formed of a first microcommand register MBR1 and a second microcommand register unit MBE2. The microcommand contained in the first microcommand register MBR1 contains certain parts which trigger various functions in the units of the DMA control device. In the part F1, the address of the address register is stored in the address unit AU (FIG. 2), which is to be read or written into. There is indicated in the part F2 by what magnitude the content of the addressed register ADR is to be changed. Part F3 indicates whether a data transfer is to be carried out or only organizational work is to be done. Part F4 indicates whether a data transfer between the data transmitter and the DMA control device and the data receiver is to be performed. From part F5, there is stored the target register in the DMA control device wherein the read data are to be stored; part F6 indicates which channel was selected by the priority circuit PR; it can be seen from part F7 whether the operation should be read or write; it is apparent from part F8 whether the data transfer should be byte-wise or word-wise; and parts F9 and F10 are assigned to the sequencer SE. It can be concluded from these parts, respectively, if a jump is required from the current microcommand to another microcommand and how the conditioned multiplexer CC or command decoder MAP is controlled.

The content of the microcommand register MBR1 is partly transferred into the second microcommand register MBR2 and is interim stored thereof. This interim storage permits the current microcommand to remain at least partially intact while the next microcommand is already being transferred from the intermediate microcommand register MPIR into the first microcommand register MBR1.

The current microcommand is then transferred from the second microcommand register MBR2 into the second microcommand register unit MBE2 and applied from there via a multiplexer MUX4 to an internal address/control bus IA. The information contained in parts F3 to F8 of the microcommand then becomes effective via the internal address/control bus IA. By means of the second microcommand register unit MBE2, assurance is provided that the next microcommand will become effective via the first microcommand register MBR1, even while the current microcommand is still effective via the second microcommand register unit MBE2 at the internal address/control bus.

The address unit AU is formed of an address register set ADR, an address adder AD1, and a third multiplexer MUX3. In the address register ADR, which is shown in greater detail in FIG. 4, the addresses for the data transmitter, data receiver and channel command are stored. These addresses can be delivered at the output ED of the address register ADR. They are fed simultaneously to the address adder AD1 which calculates the new address. For this purpose, the quantity which must be added to the old address is fed to the address adder AD1 via the multiplexer MUX 3.

This quantity is obtained, for example, either from part F2 of the microcommand register MBR1 or from a register RG1, or from the data register DAR of the data unit DU. The multiplexer MUX3 is controlled by the part F2 of the microcommand register MBR1. The newly computed address from the address adder AD1 is again stored in the address register in the address register set ADR. The address registers are selected by means of the address ARG which is stored in the part F1 of the microcommand register MBR1. Each channel has its own address register. Because the part F1 of the microcommand stored in the microcommand register MBR1 is directly connected to the address unit AU, the address unit AU can fulfill the task assigned to it by the microcommand, while the microcommand is stored in the first microcommand register MBR1.

New addresses or addresses modified by the address adder AD1 can be stored in the address register ADR via the internal data bus ID. The addresses which are delivered by the address register ADR at the output ED, can be transferred into an address buffer circuit PS1 of the interface circuit. The latter contains an interim memory SW3, an address adder AD2 and a further interim memory ZW4.

By means of the address adder AD2, the address can be increased accordingly in the case of word-wise transfer. The address buffer circuit PS1 is connected to the external address bus AB, via which it can give out addresses stored in the address registers ADR. However, it can also receive addresses via the address bus AB, interim-store them in the interim memory ZW4, and feed them from there to the internal address/control bus IA via a switch S1.

The interface circuit BEU (FIG. 2) further contains the data buffer circuit PS2 formed of an interim memory ZW5, an input register EPS and an output register APS. The data buffer circuit PS2 is connected to the internal data bus DB and, specifically, to the interim memory ZW5. The data unit DU is arranged between the input register EPS and the output register APS. The data coming from a data transmitter are interim-stored in the data buffer circuit PS2, upon a read command, before they are transferred further into the data unit. Conversely, the data coming from the data unit DU are interimstored in the data buffer circuit, upon a write command, before they are transmitted to the data receiver. Via the data buffer circuit PS2, addresses which come from the address buffer circuit PS1 can further be passed-on to the external data bus DB. Finally, there is also a direct connection between the data buffer circuit PS2 and the internal data bus ID, so that data can also be fed directly into the internal data bus ID, bypassing the data unit DU, or can be taken over by the internal data bus ID.

The matching circuits ANS (FIG. 2) and the clock generator TG are further units of the interface circuit BEU. The matching circuit ANS is connected to the external control bus SB and receives control information via the latter, for example, from the microprocessor MP (FIG. 2). The matching circuit ANS, furthermore, gives control information to the control bus SB, leading, for example, to the data transmitter or data receiver, and communicates to them whether reading or writing is desired, and so forth. To the matching circuit ANS, there is connected a bus arbiter ARB, by means of which the bus access of the DMA control device is controlled. This bus arbiter ARB delivers bus request signals HOLD as well as accepts acknowledgement signals HLDA (see also FIG. 1). A circuit arrangement ITS for generating or receiving interrupt requests EOD or JT can also be assigned to the interface circuit BEU. This circuit arrangement JTS is connected to the sequencer SE in order to communicate to the latter when an external interrupt request is present. It is furthermore, connected to the control register set CR, and specifically to a register for the channel command word, from which is found whether the circuit arrangement JTS is to deliver an interrupt request. A case in which an interrupt request can be delivered is reached if the byte counter unit BZ indicates that the number of data assigned to a transfer command has been transmitted. For this reason, the byte counter unit BZ indicates that the number of data assigned to a transfer command has been transmitted. For this reason, the byte counter unit BZ is likewise connected to the circuit arrangement JTS. By means of the clock generator TG, internal clock pulses T1 and T2 are generated form the external clock frequency CL. By means of a further clock generator TGE, further clock pulses required for the operation of the DMA control device can be generated; for example, the clock pulses occurring in the external bus BU can be generated by this clock generator TGE in order to obtain matching of the internal clock pulses to the clock pulses in the external bus BU.

The data unit DU which is formed primarily of a data register DAR is connected to the data buffer circuit PS2 and to the internal data bus ID and internal address/control bus IA. Upon read commands, the data unit DU is controlled by the content of the second microcommand register unit MBE2 and can therefore be active if the current microcommand is stored in this second microcommand control unit MBE2. In the time wherein the current microcommand is present in the second microcommand register unit MBE2, data can therefore be stored in the data register DAR and subjected in the data unit DU, for example, to comparison operations.

The data unit DU contains further units wherein the data which have been read can be checked, for example, by comparison with stored data. For this purpose, the data unit DU contains a comparison register VGR, wherein the reference values are stored, and a comparator VG, wherein the reference values are compared with the actual values fed-in via the data buffer circuit PS2. If equality, for example, exists, a signal is delivered to the sequencer SE and, specifically, to the conditional multiplexer CC. The comparator VG is likewise active if the current microcommand is stored in the second microcommand register unit MBE2, because the comparison is always carried out with read data.

The byte counter unit BZ is made up of a register BZR and a byte counter BZZ. The number of bytes to be transmitted per transfer command is stored in the register BZR. By means of the byte counter BZZ, the number of transmitted bytes per transfer command is counted. If the desired number has been transmitted, the byte counter unit BZ transmits a signal to the sequencer SE and to the circuit arrangement ITS for generating an interrupt request.

The control register set CR which is likewise connected to the internal data bus ID and to the internal address/control bus IA, contains at least one command register GCR, a mode register GMR, a channel status register CSR, and a channel command register CCR. The channel command register CCR contains the current or actual channel command which is to be executed by the sequencer SE. For this reason, the channel command register CCR is also connected to the sequencer SE. The command register GCR contains the start and stop command, respectively, from which it is determined, for example, via which channel or subchannel a data transfer is to take place. The command register CCR is likewise connected to the sequencer SE. It can be seen from the mode register GMR, in which manner the data transfer must be carried out, for example, whether there is to be multiplex operation, whether interrupt requests EOD are to be made, and what priority the unit requesting the data transfer has.

Figure 4:
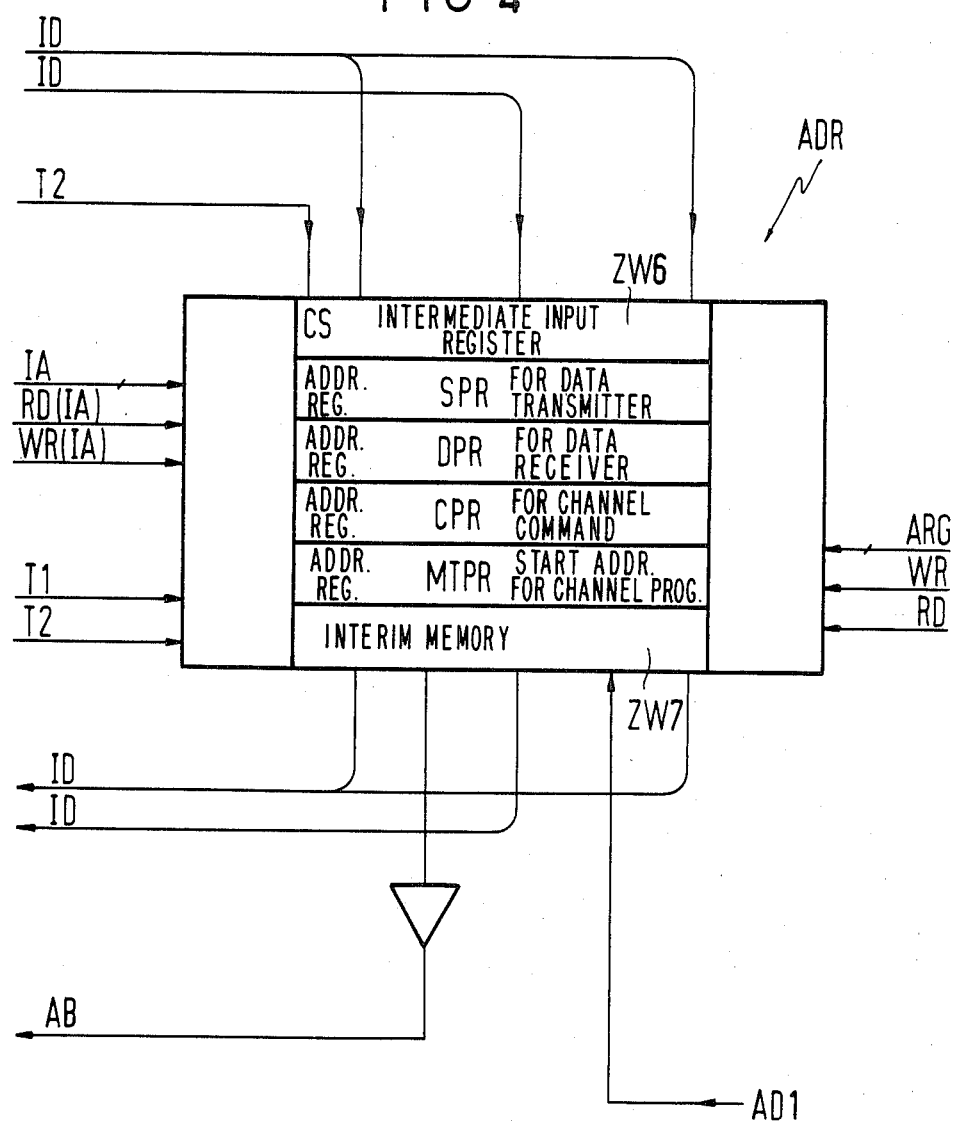
FIG. 4 is a block diagram of the address registers of the address unit forming part of the DMA control device.

In the channel status register CSR, there is, finally, indicated for which reason the data transfer was terminated i. e. the status of the channel at the end of the data transmission. Both the mode register GMR as well as the channel status register CSR are connected to the sequencer SE. Because the DMA control device must control the data transfer via several channels (not FIG. 1), to which different difference priorities are assigned, it is possible that after a transfer command or part of a transfer command via one channel has been executed, the next transmission must take place via another channel. In order that a change from one channel to another channel can be made as rapidly as possible, a multiplicity of the registers arranged in the DMA control device, namely, all registers specific to a channel, are provided in multiples. Thereby, information for several channels can be stored simultaneously in the DMA control device. Among the registers provided in multiple, there are, for example, the microcommand address register MA, the intermediate microcommand register MPIR, the address register ADR, the data register DAR, the comparison register VGR, the byte counter register BZR, the channel status register CSR and the channel command register CCR. These registers then contain separate subregisters for each channel.

in FIG. 4 there is shown a more detailed construction of the address register ADR in the address unit AU. In the address register set ADR, there are contained an address register CPR for receiving the address of the channel command, an address register SPR for receiving the address of the data transmitter, an address register DPR for receiving the address of the data receiver and an address register MTPR for receiving an address part of the start address for the channel program thereof, which is assigned to a subchannel. The address registers are preceded by an intermediate input register ZW6 and are followed by an interim register ZW7 at the output. The address registers are addressed for writing or reading via control signals from the internal address and control bus LA in dependence upon clock signals T1 and T1 from the clock generator TG. The address of the address register to be written-in or to be read is taken from the first microcommand register MBR1 and applied to the register set ADR. This address is identified by ARG in FIGS. 3 and 4.

Figure 5:
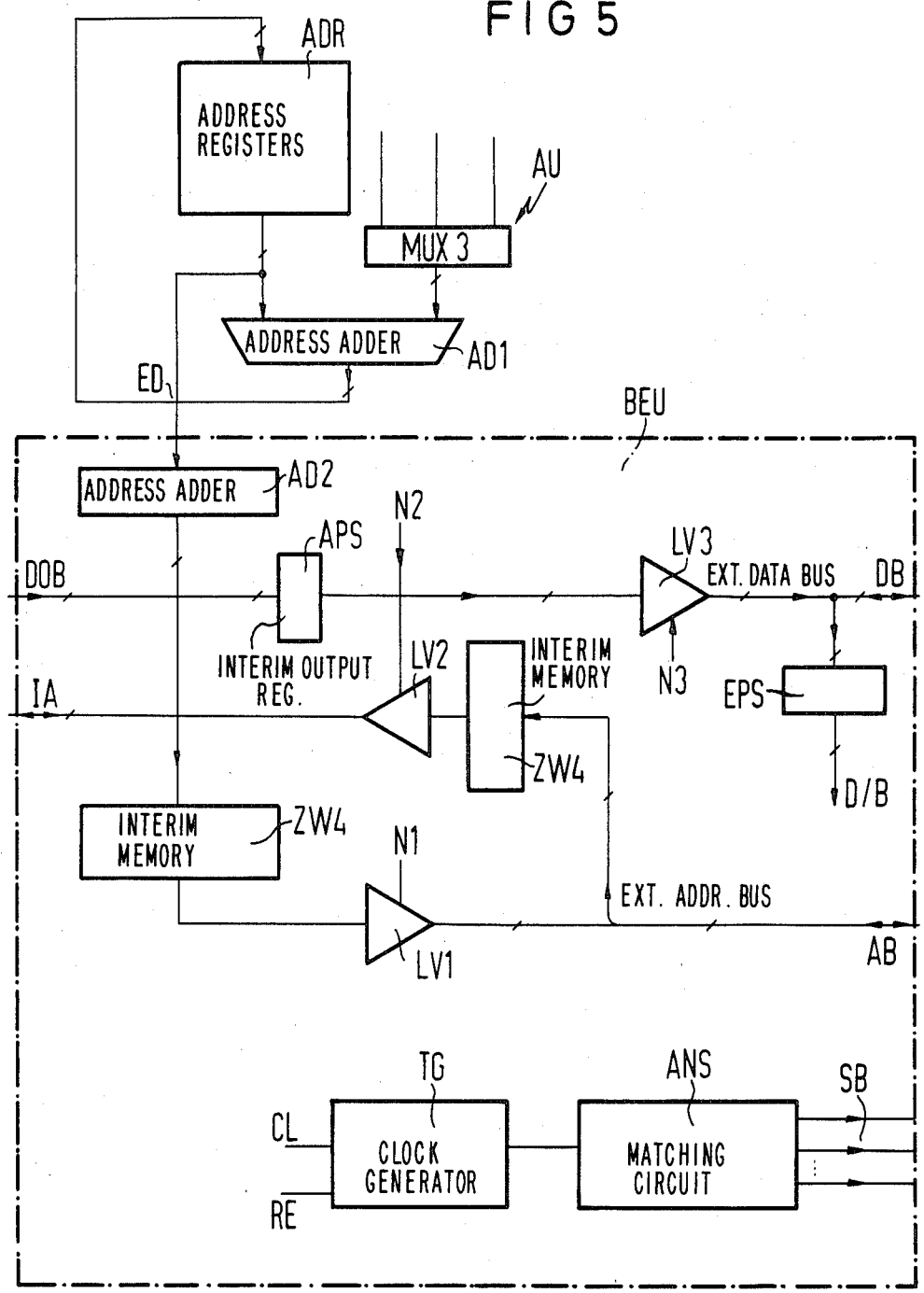
FIG. 5 is a block diagram of the interface circuit forming part of the DMA control device.

A more detailed example of the interface circuit BEU is seen in FIG. 5 wherein the address unit AU is shown again with the parts already described hereinbefore. The output ED of the address unit AU leads to the address adder AD2 and from there to the interim memory ZW4. Via a line amplifier LV1, the address is then passed-on to the external address bus AB. The line amplifier LV1 can be switched off by means of a signal N1. This is necessary if addresses are applied to the interface connection by the external address bus AB. These addresses are then stored in another part of the interim memory ZW4 and travel from there to the internal address/ control bus IA via a line amplifier LV2. The line amplifier LV2 can likewise be switched off. This is done by means of a signal N2. Data coming from the external data bus DB are fed to the data register DAR (FIG. 3) via an internal bus DIB. Data to be read out by the data register DAR are transferred to the interim output register APS via an internal bus DOB, and travel from there to the external data bus DB via the line amplifier LV3. The line amplifier LV3 can likewise be switched off by means of a signal N3. The interface circuit BEU, finally, contains a clock generator TG and a matching circuit ANS, as already shown in FIG. 3. Control signals then go from the matching circuit ANS to the control bus SB.

Figure 6:
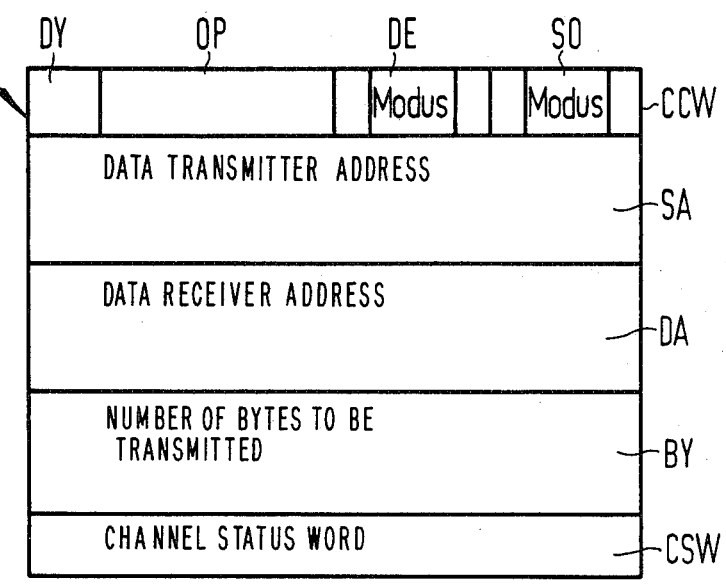
FIG. 6 is a diagram of a channel command of the channel program.

The data transfer from the data transmitter to the data receiver occurs in dependence upon a channel program, which contains transfer commands for controlling the data transfer and control commands for executing organizational operations. The channel programs may, for example, be stored in the memory MM and can be modified there by the microprocessor MP. The construction of such a channel command is shown in FIG. 6. The channel command is made up of the channel command word CCW, the data transmitter address SA, the data receiver address DA, the number of bytes BY to be transmitted and the channel status word CSW. The channel command word CCW contains various components. In the first component DY, there is indicated whether a transfer command or a control command is being executed. In a second component, the operational code OP is given, from which is seen whether, for example, branching should be carried out in the channel program or a stop command is present, or whether external interrupt requests are to be evaluated or not. A third component DE contains instructions as to how the data receiver address is to be modified (mode), whether a byte or a word is to be transmitted, and in which direction the data transfer is to take place. The component SO indicates whether the data transmitter address is to be modified, whether bytes or data words, respectively, are to be transmitted, and which direction the transfer takes. The state or condition of the channel after the completion of a channel command is incorporated in the channel status word CSW.

The operation of the DMA control device is explained hereinafter. It is assumed, in this regard, that the DMA control device performs the data transfer between a transmitter and a receiver in selector operation. Before the DMA control device begins to operate, it is reset to a starting position by means of a reset signal RE. A corresponding signal is delivered, for example, by the microprocessor MP. The microprocessor MP further loads the mode register GMR, the command register GCR with the start command, and the address register CPR in the address register set ADR with the address of the first channel command. The associated channel program is to be stored in the memory MM.

With this information, the DMA control device can start processing the channel program. For this purpose, the sequencer SE in dependence upon the command in the command register GCR, controls the corresponding microprogram in the microprogram memory MPS from which microcommand upon microcommand are transmitted via the intermediate microcommand register MPIR to the microcommand register units MBE1 and MBE2 and are then executed. In this process, the channel status register CSR is initially reset, and then the first channel command, the storage address of which is stored in the address register CPR, is transferred into the channel command register CCR. If the channel command is a pure control command, this channel command is executed. To this end, the sequencer SE addressed the associated microprogram in the microprogram memory MPS by means of its command decoder MAP which is connected to the channel command register CCR. If a transfer command is present, however, the address register SPR, in which the address of the data transmitter is contained, is first charged by the DMA control device. This address is in the channel command and is obtained by means of the address in the address register CPR. Thereafter, the address register CPR, in which the address of the data receiver is contained, is loaded. This address is likewise obtained from the channel commend, and the corresponding memory address is likewise obtained from the address register CPR. Thereby, the registers which are necessary for the data transfer in selector operation are loaded.

Then, the DMA control device can execute the transfer command. The corresponding channel command word is located in the channel command register CCR. By means of the command decoder MAP, the sequencer develops from the channel command word the address of the microprogram in the microprogram memory MPS which is assigned to this command word. By means of the microcommands which are contained in this microprogram and which are transferred into the microcommand register units MBE1 and MBE2, the steps required for the data transfer are then executed. The traffic which the data transmitter and the data receiver is carried on in a conventional manner via interrupt requests DREQ and acknowledgement signals DACK. This means that if the data receiver or the data transmitter is ready for transmission, it gives an operating request DREQ to the priority circuit PR which selects the highest priority among several requests and accordingly sets the individual registers in the DNA control device. The data transfer then proceeds via the selected channel. For this purpose, the data to be transmitted are transferred from the data transmitter into the DMA control device, and more specifically into the data register DAR, and are subsequently passed-on by the data register DAR to the data receiver.

Because the transmission of the data between the data transmitter and the data receiver should proceed at as high a rate as possible, in which case it should further be taken into consideration that, after each data transfer (write or read), a change of channels is possible, the individual units of the DNA control device must operate independently of one another as much as possible. In this connection, it must be noted that the DMA control device must carry out a number of steps before the actual data transfer is possible. Such preparatory steps are, for example: the operating requests DREQ must be evaluated by means of the priority circuit PR; the sequencer SE must read the corresponding current or actual microcommand from the microprogram memory MPS; the current or actual microcommand must be transferred into the first microcommand register MBR; the microcommand must be executed i. e. the corresponding address register ADR must be read and transferred to the interface circuit REU. Only then can the data transfer via the external bus be begun. After the data transfer via the external bus is completed, the data which have been read must further be taken into the target register, for example, the data register DAR, and optionally, comparison operations must be performed with the transmitted data and, possibly a secondary treatment must be derived therefrom. All of these steps are controlled by the current or actual microcommand in the microcommand register units MBE.

If, in spite of this multiplicity of steps in the execution of a data transfer, data are to be transmitted between the data transmitter and the data receiver at high velocity, then the individual microcommands which are required for controlling the data transfers must be addressed and executed overlappingly. This overlapping control and execution of the microcommand is explained hereinafter with the aid of the timing diagram of FIG. 7.

Figure 7:
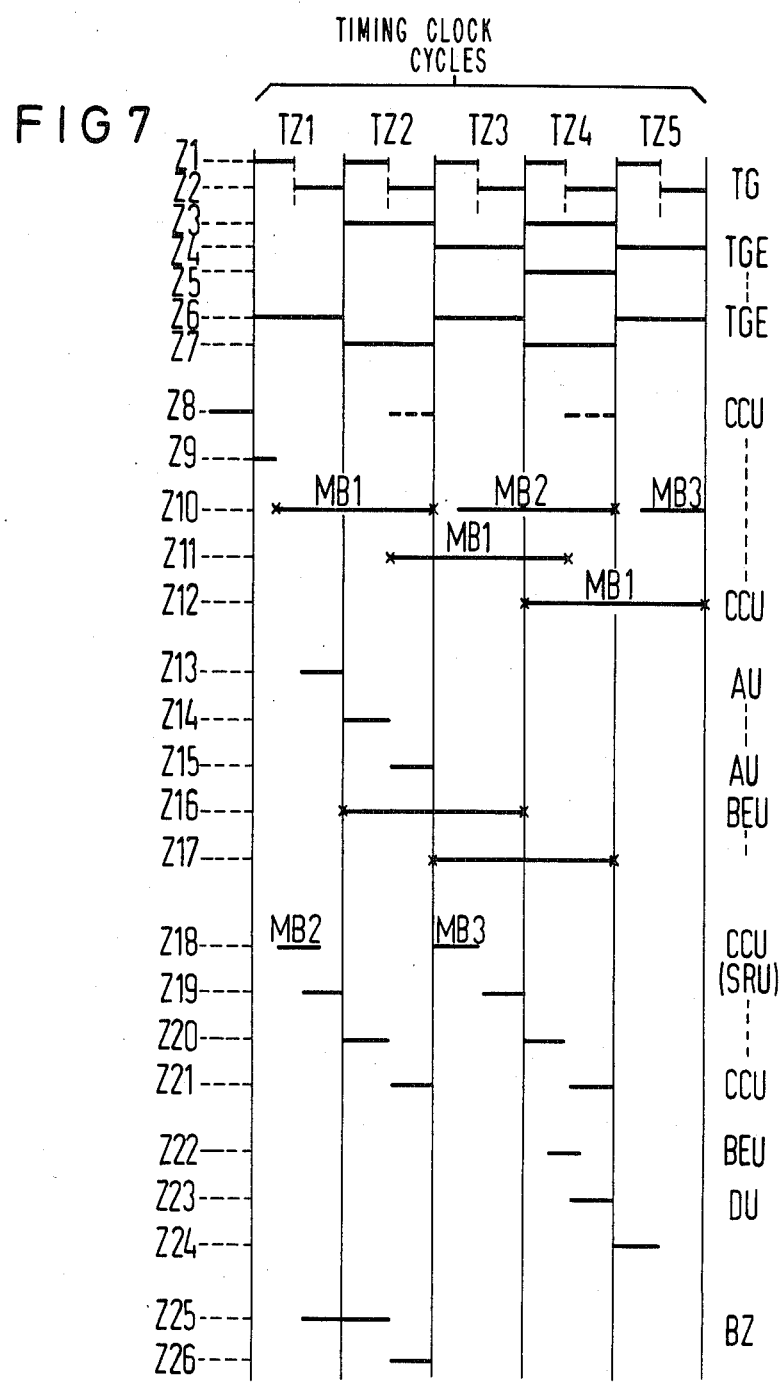
FIG. 7 is a timing diagram showing the overlapping activity of the individual units of the DMA control device.

According to FIG. 7, the timing diagram is subdivided into individual clock cycles TZ2 and TZ5. These clock cycles TZ are obtained by means of clock signals which are furnished by the clock generators TG and TGE. The clock generator TG generates, for example, the internal clock cycles T1, T2, and the clock generator TGE generates the clock signals TVB and TVE. For matching the internal clock signals to the clock signals of the external bus, the clock pulses TE1, TE2 and TE3 can be generated additionally. These different timing signals are necessary because some units of the DMA control device are active for several clock cycles TZ for a single microcommand, however, parallel thereto and with other timing situations, other units are effective also for the same microcommand or for another microcommand.

The clock signal T1 is shown in line Z1, the clock signal T2 in line Z2, the clock signal TE1 in the Z3, the clock signal TE2 in line Z4, the clock signal TE3 in line Z5, the clock signal TVB in line Z6, and the timing signal TVE in line Z7.

Before the data transfer can be started, the channel via which the transmission is to take place is determined by the priority circuit PR. The activity of the priority circuit PR, which is shown in line Z8, is present thus prior to the clock cycle TZ1, for a current or actual microcommand to be executed. For further microcommands, the time in which the priority circuit PR operates is shown by broken lines.

For the further description presented hereinafter, it is assumed that the current or actual microcommand, identified as MB1 in FIG. 7, is already stored in the intermediate microcommand register MPIR i.e. the addressing and read-out of this current or actual microcommand MB1 by the unit SRU has already occurred before the clock cycle TZ1.

In the clock cycle TZ1, the current or actual microcommand MB1 is then transferred into the first microcommand register MBR1 (line Z9); the microcommand MB1 is then operative, as shown in line Z10, during the remainder of the clock cycle TZ1 and during the clock cycle TZ2 in the first microcommand register MBR1. At the beginning of the clock signal T2, during the second clock cycle TZ2, the microcommand MB1 is transferred into the second microcommand register MBR2 and is stored there until the termination of the clock T1 in the fourth clock cycle TZ4. After the current or actual microcommand MB1 has been transferred into the second microcommand register MBR2 (line Z11), the next microcommand MB2 can be transferred into the first microcommand register MBR1. The second microcommand register MBR2 takes over the current or actual microcommand MB1 thereafter into the second microcommand register unit MBE2 (line Z12). It is stored there during the clock cycles TZ4 and TZ5. After the microcommand MB1 is transferred into the second microcommand register unit MBR2, the next microcommand MB2 can be transferred into the second microcommand register MBR2. As shown in FIG. 7 a microcommand, for example, the microcommand MB1 is effective over several clock cycles (over five clock cycles in FIG. 7) either from the first microcommand register MBR1 or from the second microcommand register unit MBE2. However, it can also be seen that two microcommands MB can be operative simultaneously; the one from the microcommand register MBR1, and the second from the second microcommand register unit MBE2.

As long as the current or actual microcommand MB1 is present in the first microcommand register MBR1, it can influence the address unit AU, because direct connections exist between the first microcommand register MBR1 and the address unit AU. Correspondingly, the address register which is addressed via the address ARG is read according to line Z13 and transferred to the address buffer circuit PS1 (clock pulse T2 in the clock cycle TZ1), the new address is computed by the address computer AD1 according to line Z14 (clock pulse T1 in the clock cycle TZ2), and according to line Z15, the new address written back into the address register (clock pulse T2 in the clock cycle TZ2). With the start of the clock cycle TZ2, the address of the interface circuit given out by the address register ADR is then available and can be read-out by the latter on the external address bus AB (clock cycles TZ2 and TZ3). In the case of a write command, as shown in line Z17, the write data is then fed to the data bus DB during the clock cycle TZ3 and TZ4. This is also effected by the interface circuit BEU.

If, on the other hand, a read command is to be executed after the address (Z16) is delivered then, as line Z22 shows, the read data are transferred into the data buffer circuit PS2 in the clock cycle TZ4 during the clock signal T1 and, according to line Z23, the read data are passed on to the date unit DU during the clock pulse T2 of the clock cycle TZ4. There, it can be processed, for example, compared in the comparator circuit VG, with a reference value and, after processing, stored in the target register during the clock pulse T1 of the clock cycle TZ5 (line Z24).

While the current or actual microcommand MB1 is stored in the first microcommand register MBR1, the address to the next microcommand is calculated by the sequencer SE. During the clock pulse T2 of the clock cycle TZ1, a new microcommand address is calculated according to the line Z18, and interim-stored in the microaddress register MA during the clock signal T2 of the clock cycle TZ1 according to the line Z19. According to line Z20, the associated microcommand is read out from the microprogram memory MPS during the clock pulse T1 of the clock cycle TZ2, and is interim-stored during the clock pulse T2 of the clock cycle TZ2 into the intermediate microcommand register MPIR (line Z21). Thereafter, the sequencer SE can start with the preparation of the next microcommand, the microcommand MB3.

In the lines Z25 and Z26, the activity of the byte counter unit BZ is also shown. During the clock cycles TZ1 and TZ2, the number of bytes is read from the register BZR and changed in counters BZZ (line Z25) and thereafter (line Z26) written back into the register BZR.

The diagram of FIG. 7 shows clearly that the address unit AU is active while the microcommand is stored in the first microcommand register MBR1. The data unit DU and the data buffer circuit PS2, on the other hand, are active while the microcommand is stored in the microcommand register unit MBE2. The address unit AU and the data unit DU operate independently of one another. Simultaneously therewith, the microprogram unit SRU is active; it calculates the address of the next microcommand, reads it out and transfers it into the intermediate microcommand register MPIR. The units of the DMA control device are thus active simultaneously for different microcommands MB, whereby these different microcommands can, of course, be associated with microprograms of different channels.

Five clock cycles are required according to FIG. 7 for processing a microcommand, by which the transmission of a data section is controlled. If the calculation of the address of the microcommand is added, seven clock cycles TZ are required. Because of the overlapping activity of the individual units of the DMA control device, however, a new data transmission via the bus (bus cycle) can be started every two clock cycles TZ.

The foregoing is a description corresponding to substance to German application P No. 32 41 467.9, dated Nov. 9, 1982, the International priority of which is being claimed for the instant application, and which is hereby made part of this application. Any material discrepancies between the foregoing specification and the aforementioned corresponding German application are to be resolved in favor of the latter.

We claim:

1. A DMA control device for a microprocessor system for transmitting data between a data transmitter and a data receiver comprising: a plurality of channels; an external bus having an external data bus and an external address bus and an external control bus; a plurality of data transmitters/receivers and at least one microprocessor connected thereto; a channel program containing channel transfer commands and channel control commands for controlling the transmission of the data in the external bus; a central control unit responsive to a channel command including a microcommand in a microprogram for applying address and control signals responsive to the respective microcommand to an internal bus which includes an internal data bus, an internal address bus, an internal control bus, a microprogram unit having a sequencer, and a microprogram memory connected to the sequencer for storing the microprogram included with the channel commands; said central control unit being controlled by said channel command; an address unit connected to said internal bus, wherein addresses of a data transmitter, a data receiver and the channel program are stored; said address unit serving to deliver at an output thereof said addresses in the microcommand and to simultaneously compute and store a new address therein; a data unit for interim-storing and comparing data to be transmitted being connected to said internal bus; a byte counter unit connected to said internal bus for counting the number of bytes to be transmitted upon a transfer command and, when a given number is counted, delivering a signal to said central control unit; a bus interface circuit connected to said output of said address unit, to the internal bus, and to the external bus, for transmitting the data to and from said data unit; a control register set connected to said internal bus for storing control information including a channel command word, status words, and further control information, and from which lines for transmitting control signals are connected to said central control unit; said units having means for independently executing the tasks assigned to them.

2. Control device according to claim 1, wherein said central control unit includes an intermediate microcommand register connected to said microprogram memory for intermediate storage of said microprograms; a first microcommand register unit having a first microcommand register connected to said intermediate microcommand register, to said internal bus, to said address unit and to said sequencer, and having a second microcommand register connected to said first microcommand register; and a second microcommand register unit connected to said second microcommand register and to said internal address and control bus; wherein said microcommand registers and intermediate microcommand registers serve to store microcommands therein.

3. Control device according to claim 2, wherein said control register set includes a channel status register which is responsive to said sequencer for storing the status of the channels after completion of the data transfer of a transfer command; a command register responsive to said internal bus for storing the start/stop command; a mode register responsive to said internal bus for storing data transfer modes; and a channel command register responsive to said internal bus for storing the channel command word.

4. Control device according to claim 3, further including a microaddress register and an intermediate microcommand register included in said micro-program unit, and wherein said address register set includes a plurality of registers equal to the plurality of data channels; and wherein said central control unit includes a priority circuit for selecting the registers associated with a selected channel in response to a priority stored in said priority circuit.

5. Control device according to claim 4, wherein said register set includes a plurality of data registers and control registers, said plurality being equal to said plurality of data channels.

6. Control device according to claim 2, further including an address adder and a first multiplexer and wherein said address unit is included in an address register set, and serves for storing the addresses of said data transmitter, said data receiver and said channel program, said address register set being connected to the internal address and control bus for transferring the addresses of said address register, and to the internal data bus for receiving the content of the addressed address register, said address register set further being connected to said first microcommand register for receiving the address of the address register, the content of which is transmitted to said bus interface circuit; said output of said address adder having an output connected to an input of said address register set, said address adder having one input connected to said output of said address register set and another input connected to said first multiplexer, and via which a value is provided which is added to the address delivered from the address register for modifying the address.

7. Control device according to claim 1, wherein said bus interface circuit includes an address buffer circuit connected to said output of said address unit and to said external address bus for buffer storing of said addresses of said transmitter, said data receiver, and said channel program; and a switch connected between said internal address and control bus and said output of said address unit; a data buffer circuit connected to said external data bus via an input register and an output register; and a clock generator for generating, from an external clock signal, clock signals for timingly controlling the control device.

8. Control device according to claim 7, including a data register included in said data unit, the data register which is connected to said input register and said output register of said interface circuit and is connected with said internal bus, for interim storing of data to be transmitted between said internal and external bus.

9. Control device according to claim 1 wherein said device is formed as a module in MOS technology.

10. Method of operating a DMA control device for transmitting data between a data transmitter and a data receiver via an external bus formed of a data bus, an address bus and a control bus; and having a plurality of data transmitters and receivers and at least one microprocessor connected thereto; and transmitting the data in the external bus in response to a channel program containing channel transfer commands and channel control commands, the method which comprises the steps of: generating, with a microprogram unit in response to a channel command stored in a channel command register or a command stored in a command register, the address of a first microcommand of a microprogram; transmitting the microcommand address of the microcommand to an intermediate microcommand register; next generating with the microprogram unit the microcommand address of the next microcommand of the microprogram; and next transmitting this microcommand to the intermediate microcommand register.

11. Method according to claim 10, which comprises the steps of: transmitting to the first microcommand register unit, after the first microcommand is stored in the intermediate microcommand register, the first microcommand by means of the first microcommand register unit into the first microcommand register and thereafter storing it into the second microcommand register, while the microprogram unit generates the address of the next microcommand and transfer the latter into the intermediate microcommand register; and then transferring the next microcommand from the intermediate microcommand register into the first microcommand register.

12. Method according to claim 11, which comprises the steps of: obtaining, by means of the address unit, from the first microcommand register, the address of the address register contained in the microcommand, the content which is to be transmitted to the output of the address unit; transmitting this content to the output of the address register; computing a new content of this address register by means of an address adder and the data in the microcommand; and storing the new content in this address register, while the microcommand is stored in the first microcommand register.

13. Method according to claim 12, which comprises the steps of: receiving, by the interface circuit, the address transmitted to the output of the address unit into the address buffer circuit and transmitting said address to the address bus and, in response to a write command, transmitting the write data contained in the data buffer circuit to the external data bus, while the microcommand is contained in the first microcommand register.

14. Method according to claim 11, which comprises the steps of: receiving, by means of a second microcommand register unit, the first microcommand from the second microcommand register of the first microcommand register unit and transmitting the control signals being part of the first microcommand to the internal address and control bus, while the next microcommand is being transferred into the first microcommand register of the first microcommand register unit.

15. Method according to claim 14, which comprises the steps of: transmitting, in response to a read command, after the address has been transmitted to the external address bus by the interface circuit, transferring the read data present on the external data bus into the data buffer circuit in response to the first microcommand in the second microcommand register unit, and storing the data transferred therefrom in the target register.

16. Method according to claim 11, which comprises the steps of: engaging and decrementing the content of a byte counting unit by one byte during storage of the microcommand in the first microcommand register of the first microcommand register unit.

17. Method according to claim 16, which includes comprises the steps of: transferring the first microcommand in a first clock cycle into the first microcommand register unit and storing it therein to the end of the second clock cycle; in the second half of the clock cycle, transferring the first microcommand from the first microcommand register into the second microcommand register and storing it therein to a first half of the fourth clock cycle; transferring at the beginning of the fourth clock cycle, the first microcommand from the second microcommand register into the second microcommand register and transferring it at the end of the fifth clock cycle to the internal address and control bus; in the second half of the first clock cycle, reading the address register, addressed in the first microcommand in the address unit; in the first half of the second clock cycle, recomputing the content of this address register by means of the address adder and restoring the recomputed content into said address register during the second half of the second clock cycle; feeding, at the start of the second clock cycle, the address from the address unit, via the interface circuit, to the external address bus during the third clock cycle; transferring, in response to a write command, the write data until the fourth clock cycle from the interface circuit to the external data bus; storing, in response to a read command during the first half of the fourth clock cycle, via the interface circuit, the read data transmitted to the external data bus; transferring, during the second half of the fourth clock cycle, the read data into the data unit and storing them therein; computing, during the first half of the second clock cycle, in response to a microcommand received from the microprogram unit, the address of the next microcommand to be processed; and reading during the first half of the second clock cycle, the next microcommand and storing it during the second half of the second clock cycle in the intermediate micro-command register.

18. Method according to claim 17 which comprises the steps of:: executing successively microcommands that are parts of one single microprogram.

19. Method according to claim 17, which comprises the steps of: executing successively microcommands that are parts of respectively different microprograms, wherein each different microprogram is transmitted in respective different channels.

20. Method according to claim 10 which comprises the steps of:, prior to processing a channel program, storing the start command in the command register under control of the microprocessor, storing the address of the first channel command in the respective address register of the address unit and storing the mode of the data transfer in the mode register; computing by means of the microprogram unit the address of the first micro-command of the microprogram in response to the respective start command, reading the computed address and transferring it into the first microcommand register unit, in response to said micro-command, loading the first channel command into the channel command register, and loading the address of the data transmitter and the address of the data receivers into the associated address registers of the address unit and the byte counter; and then executing the first channel command.

* * * * *

UNITED STATES PATENT AND TRADEMARK OFFICE
CERTIFICATE OF CORRECTION

PATENT NO. : 4,811,306
DATED : Mar. 7, 1989
INVENTOR(S) : Böning et al

It is certified that error appears in the above-identified patent and that said Letters Patent is hereby corrected as shown below:

In the Title Page, item (54),

"DMA CONTROL DEVICE FOR THE TRANSMISSION OF DATA BETWEEN A DATA TRANSMITTER"

should read:

"DMA CONTROL DEVICE FOR THE TRANSMISSION OF DATA BETWEEN A DATA TRANSMITTER AND A DATA RECEIVER"

Signed and Sealed this

Second Day of January, 1990

Attest:

JEFFREY M. SAMUELS

*Attesting Officer*     *Acting Commissioner of Patents and Trademarks*